United States Patent
Thaler

(10) Patent No.: US 7,096,574 B2
(45) Date of Patent: Aug. 29, 2006

(54) DEVICE FOR SEPARATING AN ANGLE ENCODER SHAFT FROM A DRIVE SHAFT

(75) Inventor: Josef Thaler, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 410 days.

(21) Appl. No.: 10/423,823

(22) Filed: Apr. 24, 2003

(65) Prior Publication Data

US 2003/0213123 A1    Nov. 20, 2003

(30) Foreign Application Priority Data

Apr. 24, 2002    (DE)    ............................... 102 19 245

(51) Int. Cl.
*B23P 19/00*    (2006.01)
(52) U.S. Cl. ........................................ 29/762; 356/138
(58) Field of Classification Search ................ 29/825, 29/729, 762, 426.5, 426.1; 33/1 PT, 572, 33/1 N; 250/231.13, 231.14, 231.18; 356/138
See application file for complete search history.

(56) References Cited

U.S. PATENT DOCUMENTS 5,758,427 A    6/1998    Feichtinger et al.
6,302,011 B1 *  10/2001    Horner ..................... 91/369.2

FOREIGN PATENT DOCUMENTS

EP    0 762 082 A1    3/1997
JP    1-270753 A    10/1989

OTHER PUBLICATIONS

Patent Abstracts of Japan document regarding Japanese publication 1-270753 A, published by Japanese Patent Office, publication available on or before Jan. 29, 2002, one page.

\* cited by examiner

*Primary Examiner*—John C. Hong
(74) *Attorney, Agent, or Firm*—Brinks Hofer Gilson & Lione

(57) ABSTRACT

A method for separating an encoder shaft of an angle encoder from a drive shaft, which are axially aligned with each other along an axial direction and are self-lockingly braced on each other by a press fit along the axial direction and a central fastening screw, which connects the encoder shaft and the drive shaft in the axial direction. A head of the fastening screw rests against an end of a bore of the encoder shaft, which receives a shank of the fastening screw, and a thread of the fastening screw is screwed into an internal screw thread of the drive shaft for bracing the encoder shaft and the drive shaft. The method includes partially turning the fastening screw out of the internal screw thread of the drive shaft and canceling the press fit by generating an axially oriented force acting between the head of the fastening screw and an end of the encoder shaft opposite the press fit.

19 Claims, 6 Drawing Sheets

DEVICE FOR SEPARATING AN ANGLE ENCODER SHAFT FROM A DRIVE SHAFT

Applicant claims, under 35 U.S.C. § 119, the benefit of priority of the filing date of Apr. 24, 2002 of a German patent application, copy attached, Serial Number 102 19 245.6, filed on the aforementioned date, the entire contents of which are incorporated herein by reference.

BACKGROUND OF THE INVENTION

1. Field of the Invention

The present invention relates to a method for separating an encoder shaft of an angle encoder from a drive shaft, which are axially aligned with each other and are self-lockingly braced on each other by an axial press fit and a central fastening screw, which connects the shaft of the angle encoder and the drive shaft in the axial direction. The present invention further relates to a device for separating this shaft of an angle encoder and this drive shaft.

2. Description of the Related Art

Angle encoders are used as measuring devices for the controllers of electrical drive mechanisms and make measured values available to a position and rpm regulator, as well as for electronic commutation. They are either installed on the housing of the electrical drive mechanism or installed in the drive mechanism housing. FIG. 1 shows an angle encoder 2 installed on the housing of an electrical drive mechanism 1 and containing an encoder shaft which is rigidly connected with the drive shaft of the electrical drive mechanism 1. The self-locking connection of the two shafts, which are axially aligned with respect to each other, is provided by a press fit which is produced by an inner or outer cone of the encoder shaft and a corresponding outer or inner cone of the drive shaft, or by a cylindrical and hollow-cylindrical form fit of both shafts, and a central fastening screw, which connects both shafts with each other in the axial direction. The self-locking bracing of both shafts is accomplished by tightening the fastening screw, whose shank has been passed through a central bore in the encoder shaft, whose screw thread is screwed into an internal screw thread of the drive shaft, and whose screw head rests against the front or bottom of a bore in the front of the encoder shaft.

FIG. 2 shows a longitudinal view through an angle encoder 2, which has been inserted in an installation space of a drive housing 10 of the drive mechanism 1 and into which a drive shaft 4 projects, which is supported by a drive bearing 11 on the drive housing 10. The angle encoder 2 has an angle encoder housing 20, in which a stationary element is arranged, on which a scanning unit 23, 24 for scanning a graduation or code disk 22 and an encoder shaft 3, which is rotatably seated in the stationary element and supports the graduation or code disk 22, are fastened, and which is seated on the stationary element by means of an encoder bearing 21. The angle encoder 2 is coupled by its stationary element to the drive housing 10 in a torsion-proof manner, wherein the torsion-proof coupling can be provided in accordance with EP 0 762 082 A, for example by a stator coupling 15 by radial clamping at the inner circumference, or in the installation space of the drive housing 10.

The drive shaft 4 has an inner cone 40, into which the outer cone 30 of the encoder shaft 3 is pushed. The encoder shaft 3 contains a central, axially directed bore 31, through which a fastening screw shank 51 of a fastening screw 5 has been pushed, whose fastening screw head 50 rests against the front face, or a recess 32 in the front face, of the encoder shaft 3. A fastening screw thread 52 engages an internal screw thread 42 of a blind bore 41 of the drive shaft 4, which is aligned with the central, axially directed bore 31 of the encoder shaft 3.

The outer cone 30 of the encoder shaft 3 is pulled into the inner cone 40 of the drive shaft 4 by tightening the fastening screw 5, and a self-locking press fit between the encoder shaft 3 and the drive shaft 4 is produced in this way.

Accordingly, when removing the angle encoder 2 from the electrical drive mechanism 1 it is necessary after the fastening screw 5 has been removed to pull the encoder shaft 3 and the drive shaft 4, which are self-lockingly braced on each other, apart from each other, or to push them apart, with a considerable force application. In accordance with the prior art, the pushing apart of the encoder shaft 3 and the drive shaft 4, which are braced on each other, is performed with different push-off methods and push-off devices, two of which are represented in FIGS. 3 and 4 and will be briefly explained in what follows.

For pushing the encoder shaft 3 off the drive shaft 4, with which it is self-lockingly connected, the central fastening screw 5 is turned out of the internal screw thread 42 of the drive shaft 5 by a hexagon screwdriver. Thereafter, in accordance with FIG. 3 a setscrew 62 is screwed into the internal screw thread 42 of the drive shaft 4 by a hexagon screwdriver of lesser jaw size, so that the internal screw thread 42 of the drive shaft 4 is not damaged during the subsequent push-off process. Subsequently a special push-off screw 61 is screwed into an internal push-off screw thread 33 of the encoder shaft 3, which is arranged in the central bore 31 in the area of the outer cone 30 of the encoder shaft 3, until the end of the push-off screw 61 comes into contact with the setscrew 52 and the encoder shaft 3 and the drive shaft 4 are axially pushed apart by this, so that therefore the self-locking press fit between the drive shaft 4 and the encoder shaft 3 is cancelled.

Accordingly, with this push-off method two additional screws, namely the setscrew 62 and the push-off screw 61, as well as two different tools for the screws 61, 62 of different head size, are required for separating the encoder shaft 3 from the drive shaft 4, and therefore the angle encoder 2 from the drive mechanism 1.

FIG. 4 shows a further known push-off device, or push-off method, wherein a special push-off screw 63 is supported in the blind bore 41 of the drive shaft 4, which has the internal screw thread 42, and with its external screw thread 64 engages the push-off screw thread 33 of the encoder shaft 3, so that by screwing in the special push-off screw 63, the self-locking press fit between the outer and inner cones 30, 40 of the drive and encoder shafts 3, 4 is cancelled and thereby the angle encoder 2 can be removed from the electrical drive mechanism, for example for maintenance or inspection purposes.

With this push-off method the parts necessary for pushing the encoder shaft 3 off the drive shaft 4 are reduced to the special push-off screw 63 and an additional tool.

However, it is disadvantageous that a special screw is required as the push-off screw 63, which possibly must be adapted to different depths of blind bore 41, depending on the type of the drive shaft 4. Moreover, the diameter of the special push-off screw 63 is relatively narrow and the special push-off screw 63 must be embodied to be relatively long, so that it becomes unstable.

Possibly different depths of the blind bore 41 in different drive shafts 4, which depend on the drive mechanism 1, are also problematical, which makes respectively special push-off screws 63 necessary. This push-off method cannot be employed in connection with a continuous internal screw thread of drive shafts.

A method and a device for pushing an encoder shaft of an angle encoder off a drive shaft, which are connected with each other by a conical press fit, is known from JP 1-270753 A. For pushing the encoder shaft off the drive shaft, a push-off screw thread is arranged in the housing of the angle encoder, which presses directly on the end of the drive shaft. Accordingly, the force required for push-off also acts on the angle encoder housing which, in case of an appropriately solid connection between the angle encoder shaft and the drive shaft, and therefore of the force required to separate the two shafts, can be deformed or destroyed.

SUMMARY AND OBJECTS OF THE INVENTION

It is an object of the present invention to disclose a method and a device for separating an encoder shaft from a drive shaft which are connected with each other axially aligned and self-lockingly, which are easy to manipulate and universally applicable, do not require drive shaft-specific push-off aids or additional or special tools, and make possible a force for separating the encoder shaft from the drive shaft, which acts directly on the encoder and the drive shafts.

In accordance with the present invention, this object is attained by a method for separating an encoder shaft of an angle encoder from a drive shaft, which are axially aligned with each other along an axial direction and are self-lockingly braced on each other by a press fit along the axial direction and a central fastening screw, which connects the encoder shaft and the drive shaft in the axial direction. A head of the fastening screw rests against an end of a bore of the encoder shaft, which receives a shank of the fastening screw, and a thread of the fastening screw is screwed into an internal screw thread of the drive shaft for bracing the encoder shaft and the drive shaft. The method includes partially turning the fastening screw out of the internal screw thread of the drive shaft and canceling the press fit by generating an axially oriented force acting between the head of the fastening screw and an end of the encoder shaft opposite the press fit.

This object is attained by a device for separating an encoder shaft of an angle encoder from a drive shaft, which are axially aligned with each other along an axial direction and are self-lockingly braced on each other by a press fit along the axial direction and a central fastening screw, which connects the encoder shaft and the drive shaft in the axial direction. A head of the fastening screw rests against an end of a bore of the encoder shaft, which receives a shank of the fastening screw, and a thread of the fastening screw is screwed into an internal screw thread of the drive shaft for bracing the encoder shaft and the drive shaft. An end of the encoder shaft opposite the press fit has a blind bore for receiving the head of the fastening screw and either a push-off device or a support device is arranged between the head of the fastening screw and a front end of the encoder shaft.

The method of the present invention and the devices of the present invention are distinguished by simple manipulation and universal applicability, which in particular does not require drive shaft-specific push-off aids or additional or special tools, as well as by a separating force, which acts directly on the shafts to be separated and does not include the angle encoder housing as a transmission.

The method of the present invention and the devices of the present invention utilize the fastening screw for producing the self-locking bracing of both shafts, which are aligned with each other, as well as for a push-off aid, whose screw thread remains in the internal screw thread of the drive shaft, when the two shafts are separated, and therefore constitutes an application point for the force. The other force application point is located at the end of the encoder shaft which receives the fastening screw head, so that a force applied between the two force application points cancels the self-locking bracing of both shafts, provided the fastening screw head had previously been slightly turned out of the internal screw thread of the drive shaft.

This preferably takes place in such a way that the end of the encoder shaft which lies opposite the press fit is provided with a blind bore, which receives the fastening screw head and is longer than the fastening screw head, and that a push-off device and/or a support device is arranged between the fastening screw head and the front face of the encoder shaft.

By this the force application point at the encoder shaft is displaced in the axial direction behind the fastening screw head, and the prerequisite is provided for either the placement of a push-off device against the fastening screw head, or a counter-support or detent for the fastening screw head is formed in order to cancel the self-locking bracing of the two shafts merely by loosening the fastening screw and placing it against the counter-support or detent. In this case the push-off force acts in both embodiments on the encoder shaft via the fastening screw, the fastening screw thread and the internal screw thread.

It is thus possible to provide the force for canceling the self-locking bracing of both shafts by a screw motion of the push-off device which, by an external screw thread, is screwed into an internal screw thread in the blind bore, and which presses at the front face against the fastening screw head of the fastening screw, whose screw thread has been slightly turned out of the internal screw thread of the drive shaft.

The push-off device can preferably be connected with an angle encoder housing surrounding at least the encoder shaft and, for separating the two axially aligned shafts, can be taken out of the angle encoder housing and screwed into the internal screw thread of the blind bore at the front face of the encoder shaft, so that the push-off device is delivered as a accessory and can be inserted, for example, into a screw plug which closes an opening in the angle encoder housing aligned with the fastening screw.

Alternatively to this, a support device can be connected positively, non-positively or incorporated in the material of the front end of the encoder shaft, or can be shaped out of the front end of the encoder shaft.

Thus, a tool, which is pushed through an opening in the support device and connected with the fastening screw head, can be used for turning the fastening screw thread out of the internal screw thread of the drive shaft, and for further turning out of the fastening screw until it comes into contact with the support device, wherein the bracing of the two shafts is cancelled by further turning of the fastening screw in the same direction of rotation.

Corresponding to the two different push-off methods, the attainment of the object by the present invention makes two push-off devices available, of which one push-off device is distinguished in that the end of the encoder shaft which is opposite the press fit has a blind bore for receiving the fastening screw head, and that a push-off device is arranged between the fastening screw head and the front end of the encoder shaft, which has an external screw thread which can be screwed into an internal screw thread of the blind bore and is supported by a front face on the fastening screw head.

For pushing both shafts apart it is therefore only necessary to loosen the central fastening screw by approximately one turn and thereafter to screw in the push-off device with the associated tool until it is in contact with the fastening screw head, and to cancel the self-locking bracing of the two shafts by further turning.

In a first variation, the push-off device includes a push-off screw, having a push-off screw thread, which can be screwed into the internal screw thread of the blind bore, a front face supported on the fastening screw head and a tool receiver for a torque to be exerted on the push-off screw.

Since the push-off screw can be designed to be relatively short and stable, it is suited for transmitting even increased separating forces without danger of damaging parts of the angle encoder housing.

In a second variation, the push-off device includes a push-off disk, having an external screw thread which can be screwed into the internal screw thread of the blind bore, a front face supported on the fastening screw head and a tool receiver for a torque to be exerted on the push-off screw.

Because it requires little space, such a push-off disk can be positively or non-positively connected with a screw plug which closes an opening in the angle encoder housing aligned with the encoder shaft, or the fastening screw.

While a push-off aid, which must be separately provided, is necessary when using a push-off screw for canceling the self-locking bracing of both shafts, the push-off disk makes the push-off aid available directly at the device. A single tool is sufficient with both push-off devices, since the central fastening screw, as well as the push-off screw or push-off disk can be provided with the same tool receiver, for example a hexagon socket of suitable width across.

An alternative device for separating shafts which are self-lockingly braced against each other is distinguished in that the front end of the encoder shaft which lies opposite the press fit has a blind bore for receiving the fastening screw head and which is longer than the fastening screw head, and that a push-off device is arranged between the front face of the encoder shaft and the fastening screw head.

With this variation the push-off device includes a support device constituting a detent for the fastening screw head, so that when loosening the fastening screw, i.e. when turning the fastening screw thread out of the internal screw thread of the drive shaft, the separating force is provided only by the screwing motion of the fastening screw, no employment of a push-off device is necessary, and only one direction of rotation, namely the one for loosening the fastening screw, is required.

The support device can include a detent formed on the front end of the encoder shaft and constituting a tapering of the diameter of the blind bore, which is connected by an adhesive connection, a snap-in connection, or a connection by the same material of the front end of the encoder shaft.

The support device can alternatively include a counter-support inserted positively into the blind bore, which can for example include a screw with a central opening for the passage of a tool which can be inserted into a hexagon socket of the fastening screw, or of a snap ring inserted into a circumferential groove in the wall of the blind bore.

The concept on which the present invention is based will be explained in greater detail by exemplary embodiments represented in the drawings.

DESCRIPTION OF THE PREFERRED
EMBODIMENT(S) OF THE INVENTION

Figure 1:
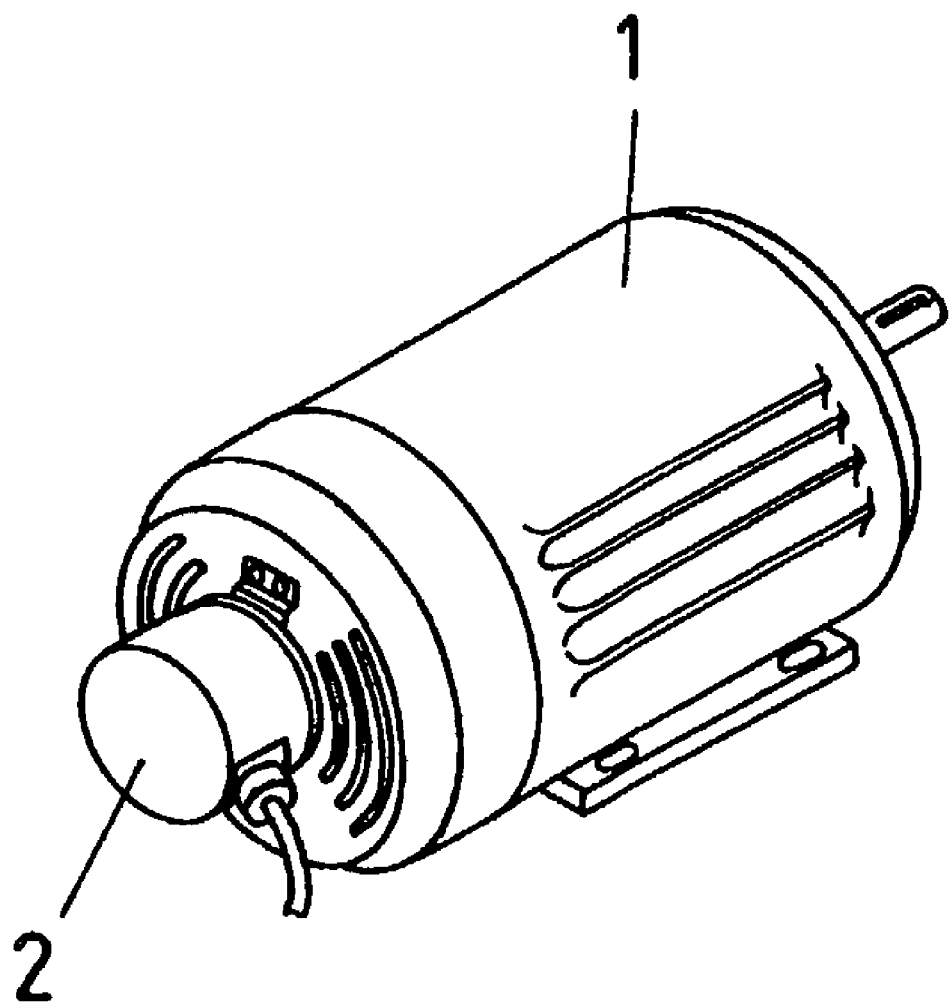
FIG. 1 is a perspective representation of a known embodiment of an angle encoder installed on an electric motor.
Figure 2:
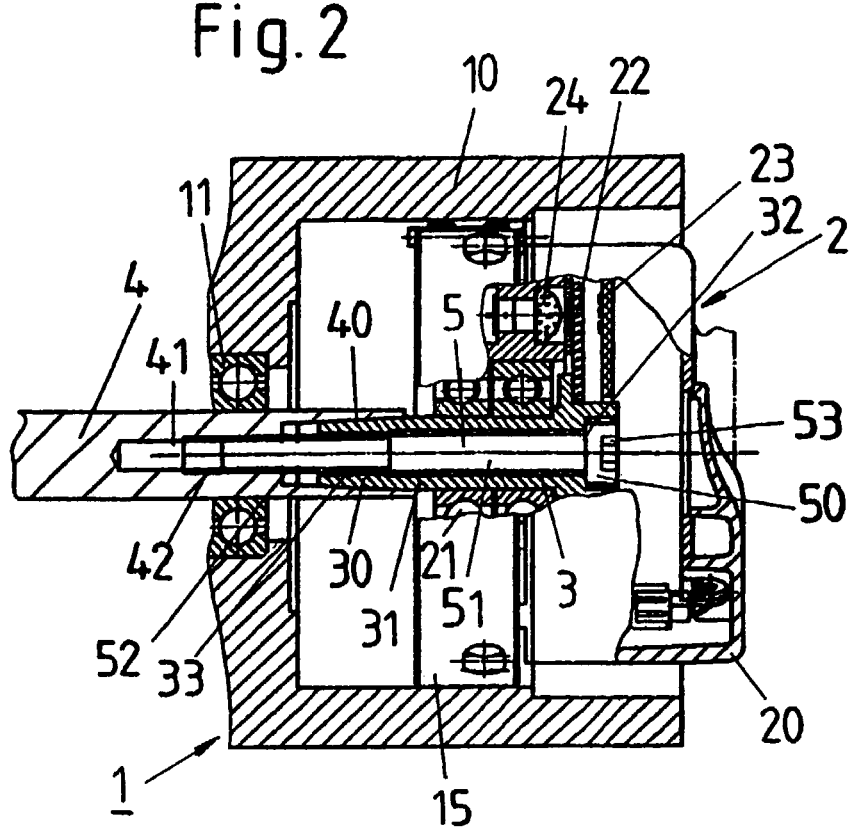
FIG. 2 is a longitudinal section through the angle encoder in FIG. 1.
Figure 3:
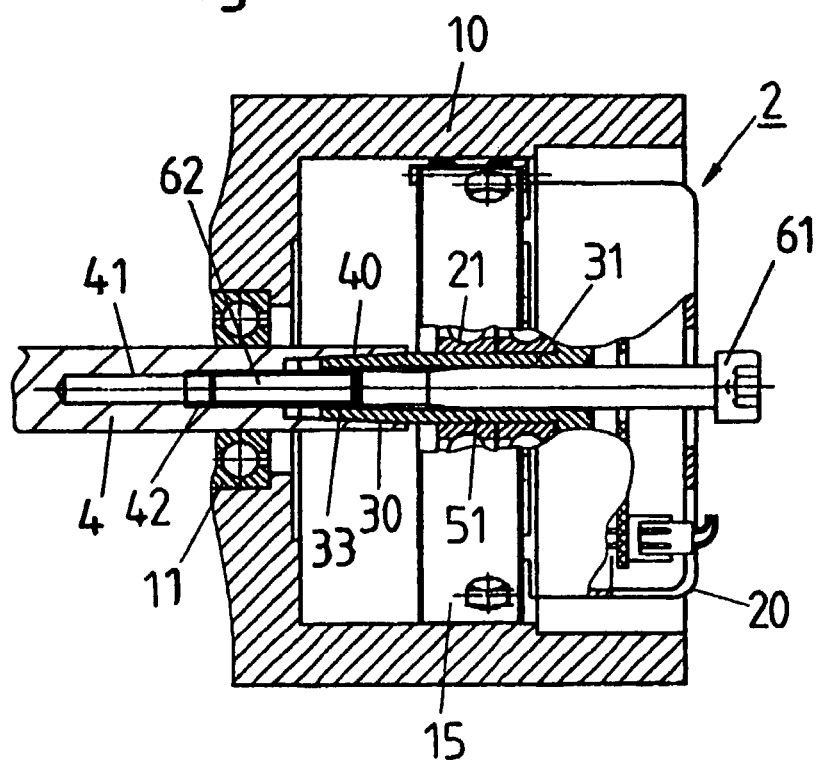
FIG. 3 is a section through the angle encoder in FIG. 1 with a setscrew inserted into the internal screw thread of the drive shaft and with a push-off screw as push-off device or aid.
Figure 4:
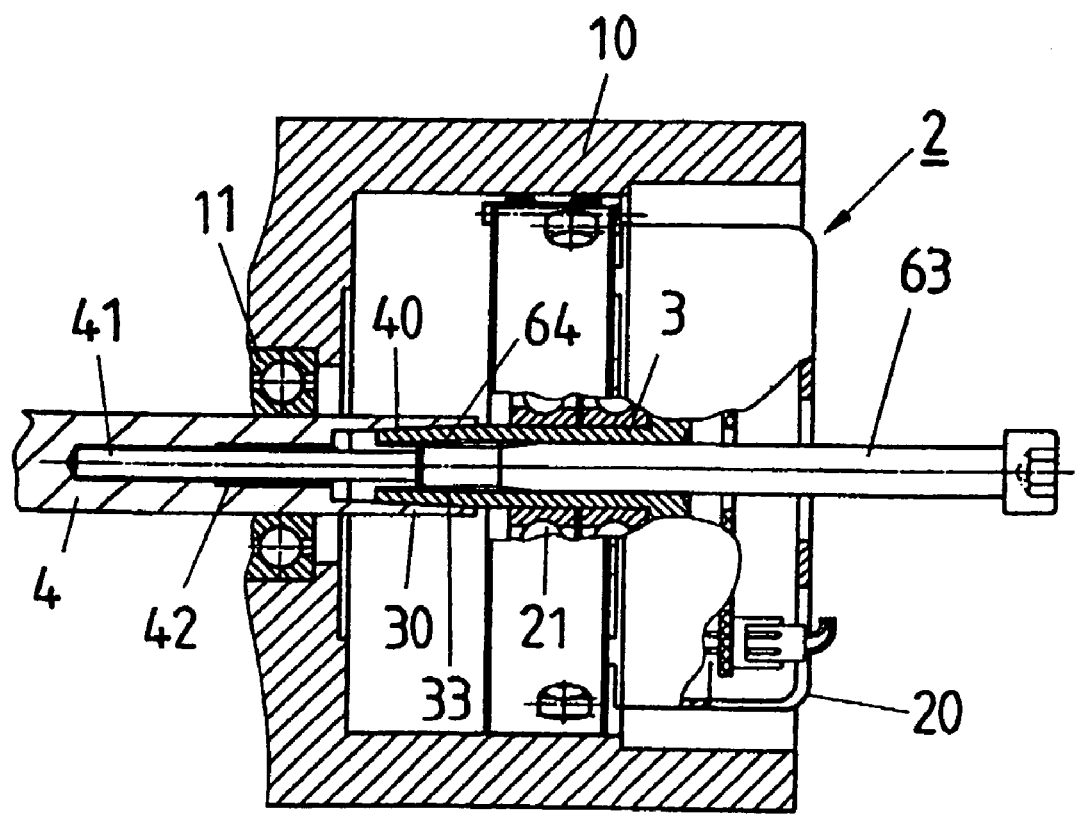
FIG. 4 is a section through a second embodiment of a known angle encoder and a drive shaft with a special push-off screw as push-off device or aid.
Figure 5:
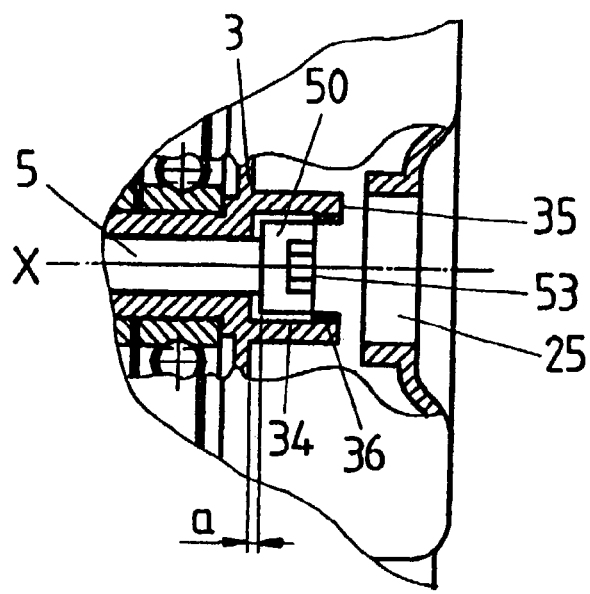
FIG. 5 is an enlarged representation of a portion of an embodiment of an angle encoder in accordance with the present invention where the front end of an encoder shaft with a push-off screw thread arranged in a blind bore of the encoder shaft.
Figure 6:
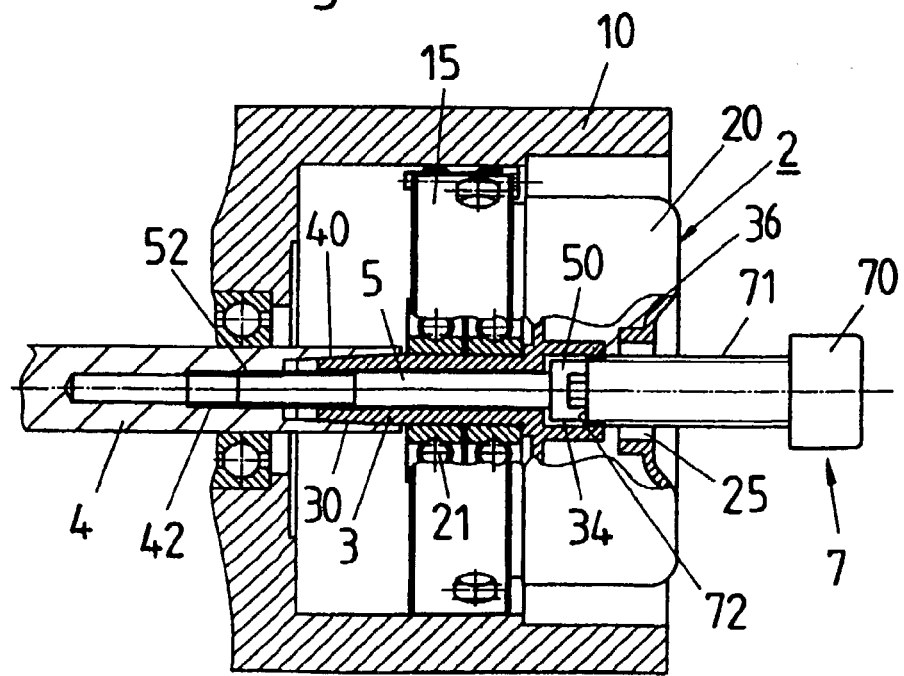
FIG. 6 is a longitudinal section through the angle encoder of FIG. 5 with a push-off screw screwed into the push-off screw thread of the encoder shaft.

In a sectional view of an angle encoder, FIG. 5 shows the front end 35 of an encoder shaft 3, whose outer cone 30 arranged at the other end of the encoder shaft 3 is, in accordance with FIG. 6, self-lockingly braced against an inner cone 40 of a drive shaft 4. The front end 35 of the encoder shaft 3 is provided with a blind bore 34, into which the fastening screw head 50 of a fastening screw 5 is inserted and rests against the bottom of the blind bore 34 for the self-locking bracing of the encoder shaft 3 against the drive shaft 4. Adjoining the opening of the blind bore 34, a push-off screw thread 36 is provided in the wall of the blind bore 34. The depth of the blind bore 34 is such that the push-off screw thread 36 lies in the axial direction behind the fastening screw head 50.

The angle encoder housing 20 has an opening 25, which can be closed by a screw plug or a closure plug, not represented in FIG. 5. A tool, for example in the form of a hexagon wrench, passed through the opening 25 is inserted into a hexagon socket 53 of the fastening screw head 50 for separating the two self-lockingly braced shafts 3, 4, and is turned in the direction of loosening the fastening screw 5 out of the internal screw thread 42 of the drive shaft 4 until a slight distance a between the bottom of the blind bore 34 and the underside of the fastening screw head 50 is provided.

In accordance with FIG. 6, the screw thread 71 of a push-off screw 7 is thereafter screwed into the push-off screw thread 36 of the blind bore 34 until the end 72 of the push-off screw 7 rests against the front face of the central fastening screw 5. In the course of continued turning of the push-off screw 7 in the same direction of rotation, the encoder shaft 3 is moved over the distance a in the direction toward the fastening screw head 50, so that the fastening screw head 50 rests against the bottom of the blind bore 34. In the process, the outer cone 30 of the encoder shaft 3 is pushed via the fastening screw thread 52 and the internal screw thread 42 of the drive shaft 4 out of the inner cone 40 of the drive shaft 4 and thereby the self-locking bracing of the two shafts 3, 4 is cancelled. By turning the fastening screw thread 52 further out of the remaining internal screw thread 42 of the drive shaft 4 it is possible to separate the angle encoder completely from the drive mechanism, if possibly provided housing screws, or the stator coupling, have been previously removed.

For actuating the push-off screw 7, the push-off screw head 70 can be provided with an outer square or hexagonal shape, or with a hexagonal socket or a cross head. A hexagonal socket of the same width across as that of the fastening screw 5 would have the advantage that only one single tool would be required for actuating the fastening screw 5, as well as the push-off screw 7.

Figure 7:
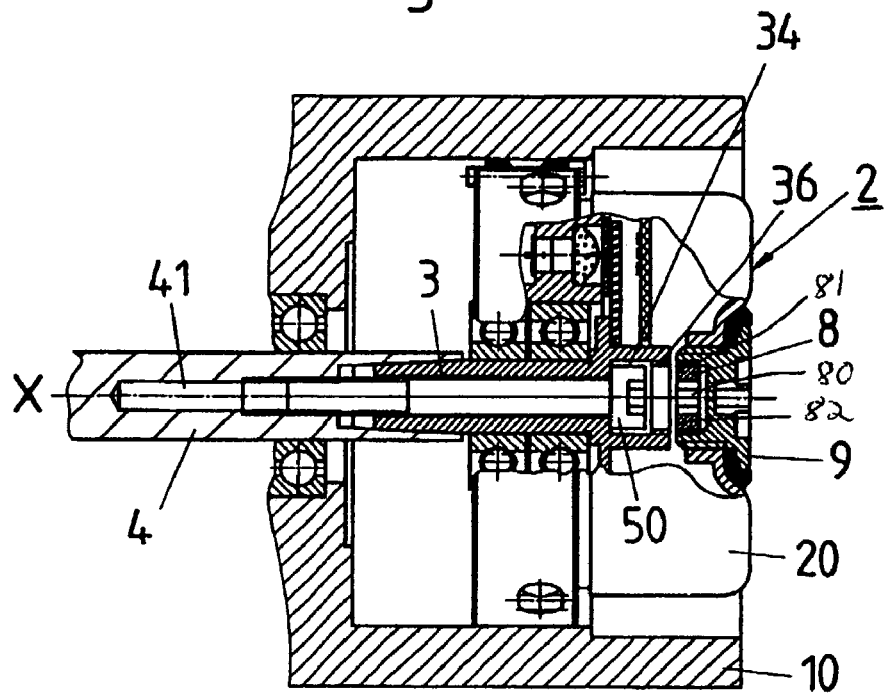
FIG. 7 is a longitudinal section through a second embodiment of an angle encoder with a push-off disk screwed into a screw plug in accordance with the present invention.
Figure 8:
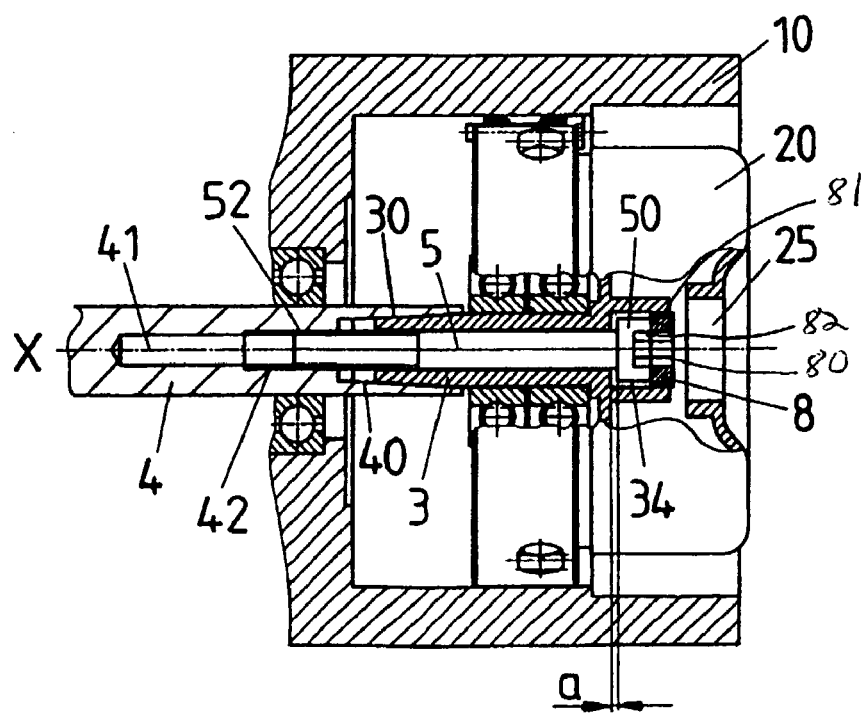
FIG. 8 is a longitudinal section through the angle encoder in FIG. 7 with the push-off disk screwed into the push-off screw thread of the encoder shaft.

A push-off aid, provided along with the angle encoder 2, is represented in FIGS. 7 and 8 as an alternate embodiment, wherein in contrast to the embodiment described above no push-off screw need to be separately provided.

In this embodiment, analogously to the embodiment in FIGS. 5 and 6, a blind bore 34 is provided at the front end of the encoder shaft 3, into which the fastening screw head 50 of a fastening screw 5 has been inserted and rests against the bottom of the blind bore 34 for the self-locking bracing of the encoder shaft 3 on the drive shaft 4. A push-off screw thread 36 is provided in the wall of the blind bore 34 adjacent to the opening of the blind bore 34. The depth of the blind bore 34 is such that the push-off screw thread 36 lies in the axial direction behind the fastening screw head 50.

A push-off disk 8 has been inserted into the screw plug 9 of the angle encoder in that the external screw thread of the push-off plate 8 is screwed together with a corresponding internal screw thread of the screw plug 9. For releasing the self-locking bracing of the drive shaft 4 and the encoder shaft 3, the central fastening screw 5 is turned out of the internal screw thread 42 of the drive shaft 4 by one turn until again a slight distance a between the bottom of the blind bore 34 and the fastening screw head 50 is achieved. To provide the slight distance a between the bottom of the blind bore 34 and the fastening screw head 50, approximately one turn of the fastening screw 5 in the direction of release of the fastening screw thread 52 from the internal screw thread 42 of the drive shaft 4 is sufficient.

The push-off disk 8 is removed from the screw plug 9 and is screwed into the push-off screw thread 36 until it rests against the fastening screw head 50. By turning the push-off disk 8 further into the push-off screw thread 36, the push-off disk 8 pushes the fastening screw head 50 against the bottom of the blind bore 34, and in the course of this the fastening screw 5 pushes the outer cone 30 of the encoder shaft 3 out of the inner cone 40 of the drive shaft 4 via the fastening screw thread 52 and the internal screw thread 42 of the drive shaft 4, so that the self-locking bracing of the two shafts 3, 4 is cancelled.

In this embodiment the push-off disk 8 used as a push-off aid is provided along with the angle encoder 2, and only one tool, for example a hexagon wrench of the same opening width, is required for actuating the central fastening screw 5, as well as the push-off disk 8. As shown in FIGS. 7 and 8, the push-up disk 8 includes an external screw thread 81, which is screwed into the internal threads 36 of the blind bore 34. The push-off disk 8 further includes a front face 82, which is supported on the head 50 of the fastening screw 5 and a tool receiver 80 for exerting a torque exerted on the push-off disk 8.

Figure 9:
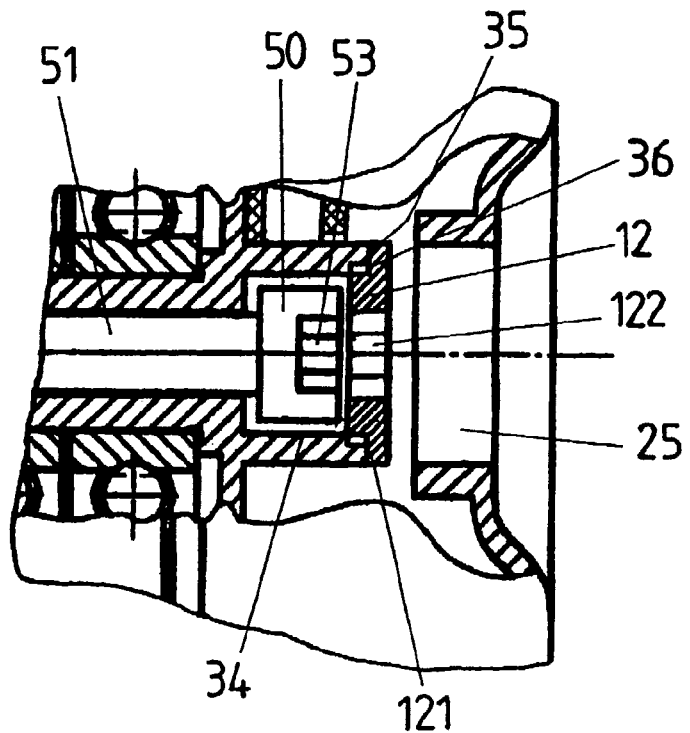
FIG. 9 is a partial longitudinal section through a third embodiment of an angle encoder with a counter-support disk screwed into a blind bore at the front end of the encoder shaft in accordance with the present invention.
Figure 10:
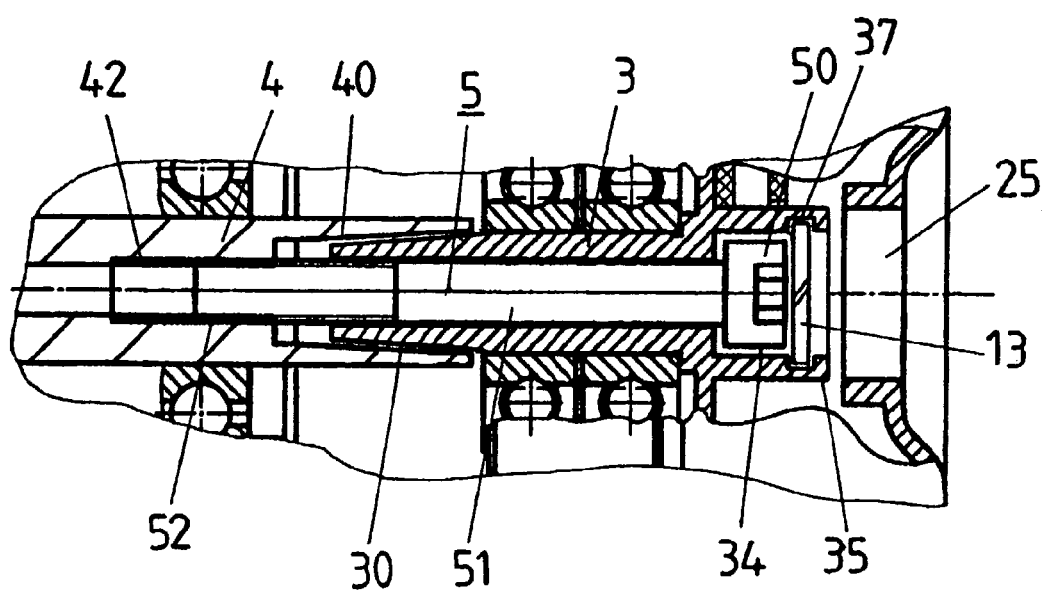
FIG. 10 is a partial longitudinal section through a fourth embodiment of an angle encoder with a snap ring inserted into a circumferential groove in the blind bore of an encoder shaft in accordance with the present invention.

Two exemplary embodiments are represented in FIGS. 9 and 10, in which a support device is used in place of a push-off device, which supports the fastening head 50 of the central fastening screw 5 for canceling the self-locking bracing of the drive shaft 4 and the encoder shaft 3.

In FIG. 9, the support device includes a support disk 12, which is screwed by a screw thread 121 into the push-off screw thread 36 at the end of the blind bore 34 and has a central opening 122 of such a size that a tool can be inserted into the tool receiver in the form of a hexagon socket 53 of the fastening screw head 50, but wherein a sufficient diameter reduction of the blind bore 34 remains, which is used for the outer circumference of the fastening screw head 50 to rest against. For inserting and fastening the support disk 12, the central opening 122 can also be embodied as a hexagon socket, whose opening across is correspondingly greater than that of the tool receiver 53 of the fastening screw head 50.

The same as the push-off disk 8, the support disk 12 can also be provided in the screw plug of the angle encoder housing or, following the insertion of the central fastening screw 5 into the encoder shaft 3, can be inserted into the blind bore 34. For mounting the angle encoder on the drive mechanism, a tool is inserted into the tool receiver 53 of the fastening screw head 50, and the fastening screw thread 52 with the internal screw thread 42 of the drive shaft 4 is screwed in for the self-locking bracing of the drive shaft 4 and the encoder shaft 3.

For separating the self-locking bracing of the two shafts 3, 4, the central fastening screw 5 is turned out of the internal screw thread 42 of the drive shaft 4 until the fastening screw head 5 comes into contact with the support disk 12. In the course of continued turning of the fastening screw 5 in the same direction of rotation, the fastening screw head 50 is supported on the support disk 12 as the second force transfer point, and the outer cone 30 of the encoder shaft 3 is pushed off the inner cone 40 of the drive shaft 4 via the fastening screw thread 52 and the internal screw thread 42 of the drive shaft 4.

In an alternative embodiment, FIG. 10 shows, instead of a push-off thread arranged in the blind bore 34 on the front end 35 of the encoder shaft 3, a radial groove 37 provided in the wall of the blind bore 34, into which a snap ring 13 is inserted as a counter-support, or support device, on which the fastening screw head 50 is supported for separating the self-lockingly braced shafts 3, 4, so that the bracing can be released analogously with the above described exemplary embodiment.

With an appropriate geometric assignment of the length of the blind bore, as well as the screw connection between the fastening screw thread and the internal screw thread of the drive shaft, it is also possible to employ, in place of a releasable positive connection between a support device and the front end of the encoder shaft, an adhesive connection between the front end of the encoder shaft and the corresponding support device, or a deformation of the front end of the encoder shaft in the sense of a reduction of the diameter of the blind bore, after the fastening screw has been inserted into the central bore of the encoder shaft.

In this case the turning of the fastening screw 5 is sufficient for the complete separation of the angle encoder from the drive mechanism. As soon as it comes into engagement with the support device, the self-locking bracing of the encoder shaft 3 and the drive shaft 4, and therefore the braced connection of both shafts 3, 4, is released. In the course of further turning of the fastening screw 5, the entire angle encoder is moved axially from the drive shaft 4. Once the fastening screw 5 has been completely turned out of the internal screw thread 42 of the drive shaft 4, the angle encoder can be removed from the installation space of the drive mechanism housing, if possibly provided attachments of the angle encoder to the drive mechanism housing, such as the stator coupling, for example, have been previously released.

The present invention is not only applicable to the described cone shaft, but to any shaft connection which cannot be separated without a push-off aid, for example cylindrical shafts with a reducing seat.

The size of the screws and the push-off threads can be embodied to diverge from the above described exemplary embodiments.

It is thus possible by the attainment of the object of the present invention to remove the screw plug, the central fastening screw and, with the push-off aid the encoder shaft, from the drive shaft with a single tool. If in addition the stator coupling can be fastened and released with the same tool, the entire angle encoder can be mounted on and removed from the drive mechanism housing with a single tool.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

The invention claimed is:

1. An angle measurement system comprising:
   a drive shaft;
   an angle encoder comprising an encoder shaft, wherein said drive shaft and said encoder shaft are axially aligned with each other along an axial direction and are self-lockingly braced on each other by a press fit along said axial direction;
   a device for separating said encoder shaft from said drive shaft, said device comprising:
     a central fastening screw, which connects said encoder shaft and said drive shaft in said axial direction, wherein said central fastening screw comprises:
       a head that rests against an end of a blind bore of said encoder shaft that is located at an end of said encoder shaft opposite said press fit;
       a shank that is received in a bore of said encoder shaft that is adjacent to said blind bore; and
       a thread that is screwed into an internal screw thread of said drive shaft for bracing said encoder shaft and said drive shaft; and
     a push-off device is arranged between said head of said fastening screw and a front end of said encoder shaft.

2. The angle measurement system in accordance with claim 1, wherein said blind bore is longer than said head of said fastening screw head, and said push-off device comprises an external screw thread, which is screwed into an internal screw thread of said blind bore, and a contact face which is supported on said head of said fastening screw.

3. The angle measurement system in accordance with claim 2, wherein said push-off device comprises a push-off screw comprising:
   a push-off screw thread, which is screwed into said internal screw thread of said blind bore;
   a front face, which is supported on said head of said fastening screw; and
   a tool receiver for initiating a torque exerted on said push-off screw.

4. The angle measurement system in accordance with claim 2, wherein said push-off device comprises a push-off disk comprising:
   an external screw thread, which is screwed into said internal thread of said blind bore;
   a front face, which is supported on said head of said fastening screw; and
   a tool receiver that initiates a torque exerted on said push-off disk.

5. The angle measurement system in accordance with claim 4, wherein said push-off disk is positively connected with a screw plug, which closes an opening of an angle encoder housing which surrounds at least said encoder shaft.

6. The angle measurement system in accordance with claim 5, wherein said opening in said angle encoder housing is aligned with said encoder shaft.

7. The angle measurement system in accordance with claim 5, wherein said opening in said angle encoder housing is aligned with said fastening screw.

8. The angle measurement system in accordance with claim 4, wherein said push-off disk is non-positively connected with a screw plug, which closes an opening of an angle encoder housing which surrounds at least said encoder shaft.

9. The angle measurement system in accordance with claim 8, wherein said opening in said angle encoder housing is aligned with said encoder shaft.

10. The angle measurement system in accordance with claim 8, wherein said opening in said angle encoder housing is aligned with said fastening screw.

11. An angle measurement system comprising:
    a drive shaft;
    an angle encoder comprising an encoder shaft, wherein said drive shaft and said encoder shaft are axially aligned with each other along an axial direction and are self-lockingly braced on each other by a press fit along said axial direction;
    a device for separating said encoder shaft from said drive shaft, said device comprising:
      a central fastening screw, which connects said encoder shaft and said drive shaft in said axial direction, wherein said central fastening screw comprises:
        a head that rests against an end of a blind bore of said encoder shaft that is located at an end of said encoder shaft opposite said press fit, wherein said blind bore is longer than said head of said central fastening screw;
        a shank that is received in a bore of said encoder shaft that is adjacent to said blind bore; and
        a thread that is screwed into an internal screw thread of said drive shaft for bracing said encoder shaft and said drive shaft; and
      a support device is arranged between a front end of said encoder shaft and said head of said fastening screw.

12. The angle measurement system in accordance with claim 11, wherein said support device is arranged at an end of said blind bore in such a way that, when said head of said fastening screw is screwed out of said internal screw thread of said drive shaft, said head comes to rest against said support device.

13. The angle measurement system in accordance with claim 12, wherein said support device comprises a detent, which is shaped out of a front end of said encoder shaft and constitutes a tapering of a diameter of said blind bore.

14. The angle measurement system in accordance with claim 13, wherein said detent is connected with said front end of said encoder shaft by an adhesive connection.

15. The angle measurement system accordance with claim 13, wherein said detent is incorporated into a material of said front end of said encoder shaft.

16. The angle measurement system in accordance with claim 12, wherein said support device comprises a counter-support, which is positively inserted into said blind bore.

17. The angle measurement system in accordance with claim 16, wherein said counter-support comprises a support disk, which is connected with a front end of said encoder shaft by a screw connection.

18. The angle measurement system in accordance with claim 16, wherein said counter-support comprises a support screw, which is connected with a front end of said encoder shaft by a screw connection.

19. The angle measurement system in accordance with claim 16, wherein said counter-support comprises a snap ring, which is inserted into a circumferential groove in a wall of said blind bore.

\* \* \* \* \*

UNITED STATES PATENT AND TRADEMARK OFFICE
CERTIFICATE OF CORRECTION

PATENT NO. : 7,096,574 B2 Page 1 of 1
APPLICATION NO. : 10/423823
DATED : August 29, 2006
INVENTOR(S) : Josef Thaler It is certified that error appears in the above-identified patent and that said Letters Patent is hereby corrected as shown below:

In the Claims

Column 11, in claim 15, line 1, before "accordance with claim" insert --in--.

Signed and Sealed this

Twentieth Day of March, 2007

JON W. DUDAS
*Director of the United States Patent and Trademark Office*